US008903616B2

(12) United States Patent
Fehse

(10) Patent No.: US 8,903,616 B2
(45) Date of Patent: Dec. 2, 2014

(54) METHOD FOR INCREASING THE SAFETY OF A VEHICLE AND CENTRAL PROCESSING UNIT FOR A DRIVER ASSISTANCE SYSTEM

(75) Inventor: Meike Fehse, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 13/387,588

(22) PCT Filed: May 27, 2010

(86) PCT No.: PCT/EP2010/057289
§ 371 (c)(1), (2), (4) Date: Apr. 9, 2012

(87) PCT Pub. No.: WO2011/012344
PCT Pub. Date: Feb. 3, 2011

(65) Prior Publication Data

US 2012/0191315 A1 Jul. 26, 2012

(30) Foreign Application Priority Data

Jul. 27, 2009 (DE) ......................... 10 2009 028 029

(51) Int. Cl.
*G06F 17/00* (2006.01)
*G08B 26/00* (2006.01)
*G08G 1/16* (2006.01)

(52) U.S. Cl.
CPC ................ *G08G 1/168* (2013.01); *G08G 1/166* (2013.01); *G08G 1/165* (2013.01)
USPC ............................................ 701/65; 340/518

(58) Field of Classification Search
USPC ............... 701/70, 68, 72, 65, 80, 93, 96, 122; 340/995.22, 437, 438, 441, 467, 518, 340/3.6, FOR. 210
See application file for complete search history.

(56) References Cited

U.S. PATENT DOCUMENTS

| | | | | |
|---|---|---|---|---|
| 6,038,496 | A * | 3/2000 | Dobler et al. | 701/3 |
| 2002/0179355 | A1* | 12/2002 | Kurz et al. | 180/169 |
| 2009/0072972 | A1* | 3/2009 | Pederson | 340/541 |

FOREIGN PATENT DOCUMENTS

| | | |
|---|---|---|
| CN | 201 015 641 | 2/2008 |
| DE | 102 23 269 | 12/2003 |
| DE | 10 2006 032 541 | 1/2008 |

OTHER PUBLICATIONS

Jun et al., "Falling-proof mechanism for the intelligent wheelchair", Database EPODOC European Patent Office, The Hague, NL, Feb. 6, 2008, XP-002600891.

* cited by examiner

*Primary Examiner* — Muhammad Shafi
(74) *Attorney, Agent, or Firm* — Kenyon & Kenyon LLP

(57) ABSTRACT

A method is provided for increasing the safety of a vehicle, a region about the vehicle being scanned and a distance between at least one location on the vehicle and a physical limit of this region is measured in at least one direction. Subsequently, it is checked whether the distance exceeds a specifiable threshold value and finally, a warning signal is output and/or the vehicle is braked, if the result of the checking is positive. Moreover, a central processing unit for a corresponding driver assistance system and a driver assistance system are provided.

9 Claims, 2 Drawing Sheets

METHOD FOR INCREASING THE SAFETY OF A VEHICLE AND CENTRAL PROCESSING UNIT FOR A DRIVER ASSISTANCE SYSTEM

FIELD OF THE INVENTION

The present invention relates to a method for increasing the safety of a vehicle, a region around the vehicle being scanned, and a distance between at least one location on the vehicle and a physical limit of this region in at least one direction being measured. Furthermore, the present invention relates to a central processing unit for a driver assistance system having a sensor interface for the connection of at least one sensor, which is suitable for scanning a region about a vehicle, and means for measuring the distance between at least one location on the vehicle and a physical limit of this region in at least one direction or means for receiving such a measured value from the at least one sensor.

BACKGROUND INFORMATION

German Patent No. DE 10 2006 032 541 describes a warning device for a vehicle having a sensor device for monitoring a close range of the vehicle and having a warning unit for outputting a warning. A sensor device is used in this context, directed onto the roadway for monitoring a remote area of the vehicle when the vehicle enters the roadway, to warn of approaching obstacles, particularly vehicles.

SUMMARY OF THE INVENTION

A method of the type named at the outset is provided, particularly including the steps:

- Checking whether the distance exceeds a specifiable threshold value, particularly during motion of the vehicle, and
- outputting a warning signal and/or braking the vehicle if the result of the checking is positive.

Accordingly, a central processing unit is also provided for a driver assistance system of the type named at the outset, additionally including:

- means for checking whether the distance exceeds a specifiable threshold value, particularly during motion of the vehicle, and
- means for outputting a warning signal and/or braking the vehicle if the result of the checking is positive.

The present invention makes it possible to warn a driver even of obstacles that are moving away. This seems illogical at first sight, for it is approaching objects that cause a collision with the vehicle. In spite of the apparent contradiction, it was recognized surprisingly that a conclusion of objects moving away can go along with a potential threat to the vehicle. As an example, one should consider the approach of the vehicle to a precipice. Getting the vehicle away from an obstacle, in this context, should be seen with reference to the vehicle, and does not necessarily imply a motion of the object. In the case of the precipice named, the ground, as seen from the vehicle is distancing itself abruptly downwards, i.e. a distance measured becomes greater. Since precipices often do not have safety means, for instance, at river banks or in the mountains, driving over this precipice may have serious results. The present invention warns of a precipice and/or brakes the vehicle, particularly to a standstill. Thus, the present invention contributes to a substantial increase in safety, and, with that, to the avoidance of damage to material and/or health.

As sensors for recording a region about the vehicle one may consider all sensors known per se, or systems for measuring the distance from an object. These are particularly ultrasonic sensors, radar sensors and laser sensors. In principle, however, video systems designed for distance measurement are also suitable, if, for instance, because of the arrangement of several cameras, there is a stereoscopic image present.

For the distance measurement as such, all methods known per se may also be considered. This may be done, perhaps, by transit-time measurement or by measurement of the phase shift of a signal radiated by the sensor and reflected at the physical limit. Distance measurement by triangulation is also possible. Of course, other combinations of the methods named or other methods may also be used.

Within the scope of the present invention, as "physical limit" one may understand the boundary surface of a body or an object that may lie in the recording region of the sensors named. It is pointed out that a distance from a physical limit within the recording region should not be equated to the recording limit of the sensors.

It is expedient if the area in front, under the vehicle and/or in the rear, under the vehicle, is scanned. If the vehicle is traveling directly towards a precipice, the distance to the ground in front of the vehicle is suddenly, or at least rapidly increased in comparison to the speed of the vehicle. The continuation of travel could result in the falling down of the vehicle. Whereas, in a forward gear, the scanning of the region lying in front of the vehicle would rather be a matter of concern, in a backward gear the region behind the vehicle is potentially more important.

In principle, the region in front of/behind each wheel may also be scanned, in order, for instance, to warn of deep potholes, since, particularly during cornering, each wheel is traveling on its own track. It is true that the vehicle cannot fall as a whole into a pothole, but damage may be created at the wheel or the axle that is involved. In addition, the vehicle could possibly get hung up in the pothole, and be not able to be moved without outside help.

It is also expedient for the region laterally below the vehicle to be scanned. The lateral approach to a precipice may also be extremely dangerous. It is true that continued travel does not lead directly to falling down of the vehicle, but loose subsurface may lead to the sliding away of the vehicle. A sudden steering motion may also lead to a precipice, lying to the side of the vehicle, being suddenly in front of the vehicle.

It is also expedient for the region laterally to the vehicle to be scanned. On parking lots on which the vehicles are lined up one against another transversely to the direction of travel (transverse or slantwise parking spaces) an orientation to vehicles already parked may help to park a vehicle correctly. One might also consider this for a temporary parking lot on a meadow (for instance, because of a big event). In such a case, as a rule, orientation possibilities, such as ground markings, are lacking for parking the vehicle "correctly". However, if there are already other vehicles on the meadow, the system is able to be applied, in order to park the vehicle in such a way that it does not interfere with the remaining traffic. In the case of forward travel, for example, the lateral front area is monitored to see whether a sudden jump occurs in the distance to the lateral boundary (that is, to a neighboring vehicle). If the vehicle continued, the front of the vehicle would project beyond the line formed by the other vehicles, and could possibly interfere with the remaining traffic. In this sense, by "increase in the safety of a vehicle" one might also understand an increase in passive safety. For, a vehicle that does not project beyond other parked vehicles is exposed to a far lower risk of parking damage.

Furthermore, it is advantageous if a plurality of distances between a plurality of locations on the vehicle and a physical limit of the region is measured. Under certain circumstances, one single distance is not sufficiently informative for determining possible endangerment. For that reason, in this variant of the present invention, the distance is measured starting from a plurality of locations on the vehicle. To give a better idea, the distances in a certain direction may also be perceived as the length of imaginary beams which point away in a certain direction from a certain location on the vehicle and (possibly) hit a physical limit in the detection region at a certain distance. If, for example, a radar or an ultrasonic sensor having a small angle of reception is used, then the imaginary beam even becomes a real beam.

It is also of advantage if a plurality of distances is measured in a plurality of directions. For the same reason as above, beams are evaluated, in this case, that run in different directions. Naturally, one may also conceive of beams starting from various points of the vehicle and pointing in various directions.

It is particularly advantageous if the outputting of a warning signal and/or the braking of the vehicle takes place only when the result of checking for a specifiable number or group of distances is positive. If even one positive result of a single beam leads to a warning or to braking, this may have undesired consequences. For example, a relatively small hole (such as when an iron or wood rod is pulled from the ground) may lead to the triggering of the system, although this hole represents no threat to the vehicle at all, and may be driven over without danger. If a plurality of positive results is obtained however, one may assume that there is a hole of a certain size that may be a dangerous size under certain circumstances. In the same way, the distances/beams may be grouped. For example, a group of beams may record the region in front of the left front wheel, and another group may record the region under the floor panel. Different groups may also be given different priorities and may trigger different actions. Thus, a hole in front of the left front wheel may lead to the braking of the vehicle, while a hole between the wheels leads only to a warning notice. In any case, it is favorable if automatic braking may also be omitted after confirmation by the driver, in order, for instance, to be able to drive onto a workshop pit in a garage.

It is also particularly advantageous to check additionally whether the change with time in the distance or the change in the distance in relation to the path covered by the vehicle exceeds a specifiable threshold value. For example, beams that run at a relatively flat angle to the direction of motion of the vehicle, no longer impinge on an object, already if the vehicle is moving on a roadway that runs downwards in an ever steeper manner. This does not necessarily go along with endangering the vehicle (such as when the vehicle is driven into a low garage. Therefore, if the distance mentioned becomes steadily greater with time and relatively slowly with respect to the speed of the vehicle or in relation to the path covered by the vehicle, a warning and or braking may be omitted. However, if the distance changes rapidly with time compared to the speed of the vehicle, or in relation to the path covered by the vehicle, then the vehicle is presumably approaching a step, and the warning is output and/or braking takes place. After the vehicle has been stopped (by the driver or by automatic braking) the driver is able to check the situation, and if necessary, continue the driving maneuver independently.

It should be noted at this point that the variants addressed for the method, as well as the effects and advantages resulting therefrom, refer similarly to the central processing unit, according to the present invention, for an assistance system and to the vehicle according to the present invention.

DETAILED DESCRIPTION

Figure 1:
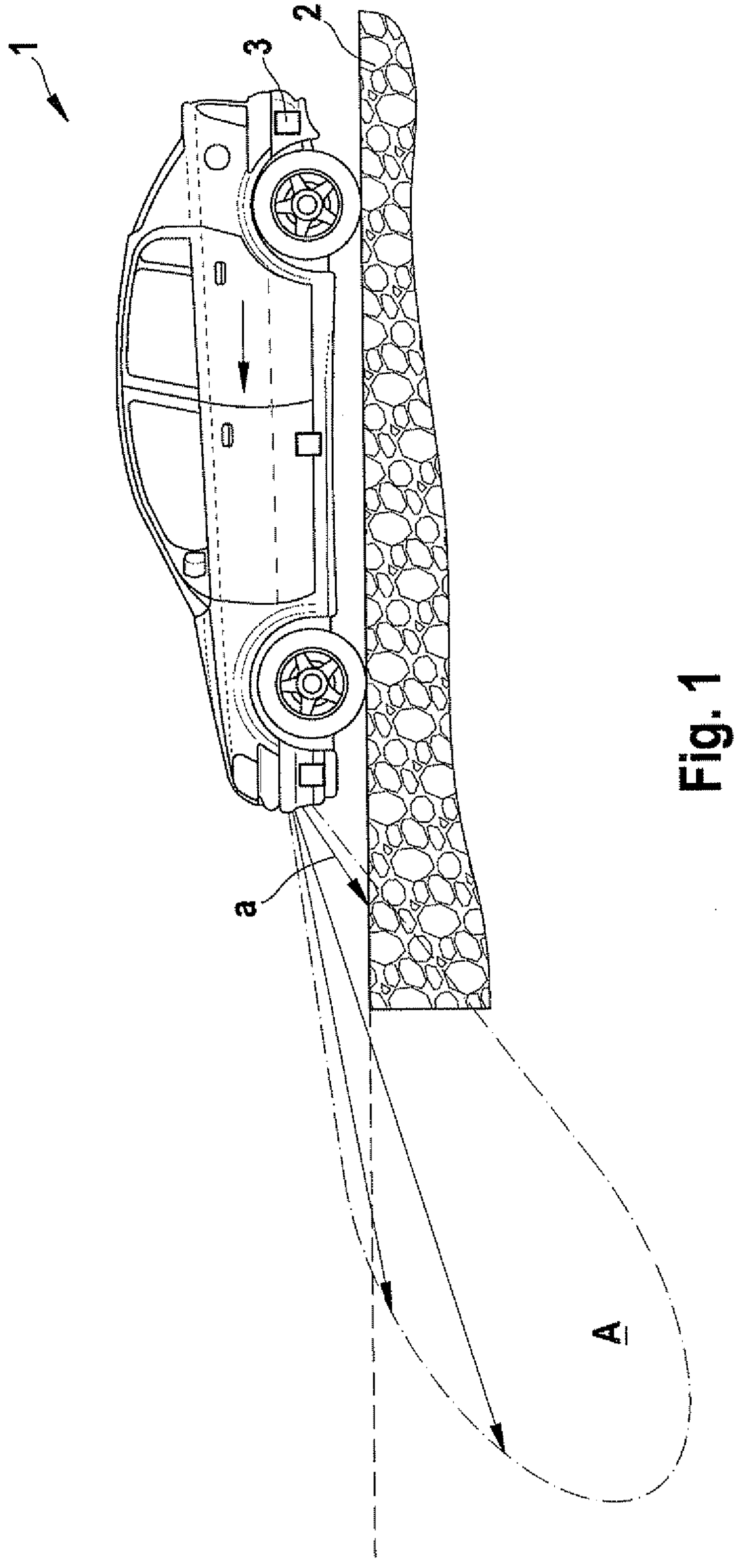
FIG. 1 shows a vehicle having an assistance system, according to the present invention, that is approaching a precipice, in a side view.

FIG. 1 shows schematically a vehicle 1 on a roadway 2, which is approaching a precipice in the direction shown by an arrow. A region A, in front, under the vehicle is being continuously scanned, and the distance a between a location on vehicle 1 and the physical limit of region A, formed by roadway 2, is ascertained in at least one direction. Distances a are visualized in FIG. 1 by the length of the beams pointing away from vehicle 1. It is easily recognized that some of the beams, within region A, already no longer impinge upon a physical limit, or rather, an object. For this reason, one may assume a potential endangerment for vehicle 1, if it moves still further. For this reason, an optical or acoustical warning signal is output to the driver and/or vehicle 1 is automatically braked or stopped.

Vehicle 2 shows the vehicle in FIG. 1 in a top view, the driver assistance system being also shown symbolically. This is made up of a central processing unit 4 having sensors 3 attached to it. Central processing unit 4, in turn, is made up of a central computing unit 5 having a connected memory 6 and sensor interfaces 7*a* and 7*b*. The latter are used to connect sensors 3 to central processing unit 4 (for instance, by wire or radio). In the example shown, vehicle 1 includes two sensors 3 in front, two in the rear and in each case three left and right. This is an exemplary specific embodiment and is used only to illustrate the functioning principle. Of course, sensor arrangements are conceivable that differ from the one shown.

Figure 2:
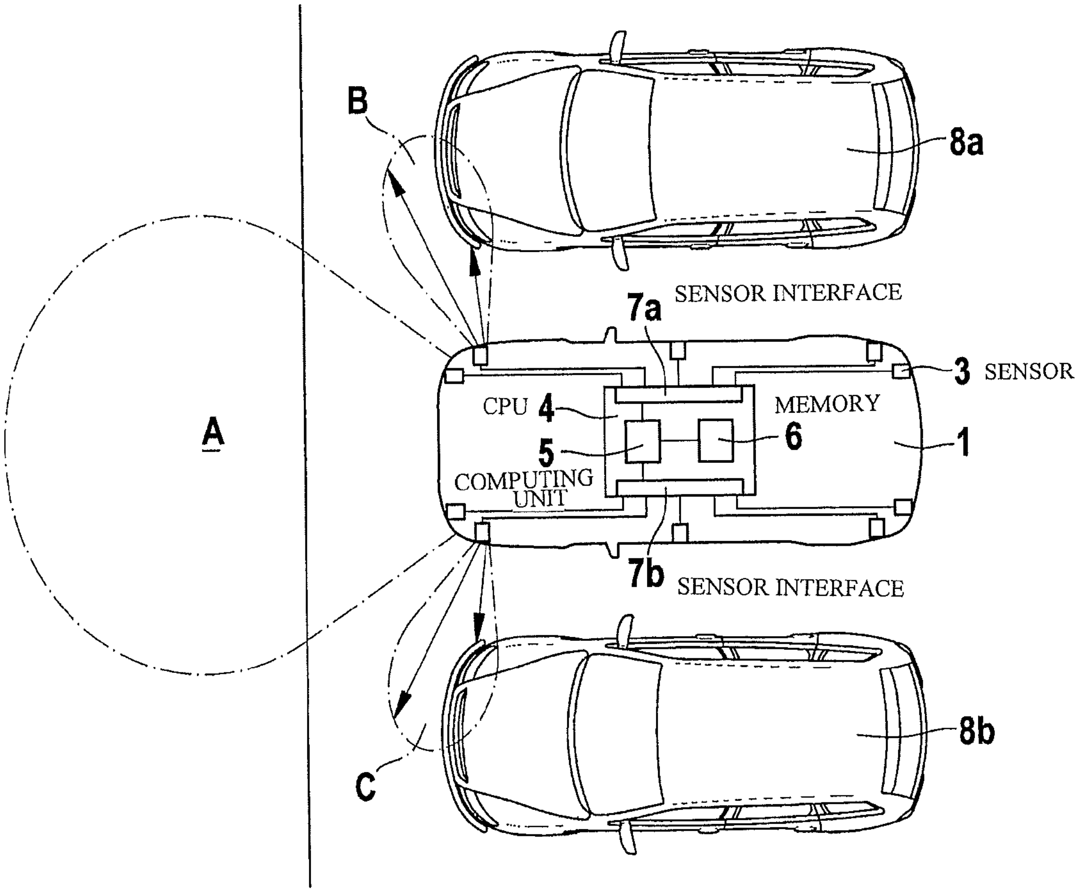
FIG. 2 shows the vehicle of FIG. 1 in a top view.

Furthermore, in the form shown, central processing unit 4 is only one of many possibilities. Whereas in FIG. 2 the method is illustrated in the form of a software program stored in memory 6 and processed by computing unit 5, an embodiment in hardware or a mixed embodiment in software and hardware are also possible. Moreover, it is conceivable that central processing unit 4 cooperates with a superordinate control (not shown) of vehicle 1, which is particularly formed by an on-board computer of vehicle 1. Finally, one may imagine that central processing unit 4 is a part of an on-board computer, perhaps in the form of a software routine running in the on-board computer and/or in the form of a subregion of the electronic circuit of the on-board computer.

Depending on the specific embodiment, the means named for making use of central processing unit 4 in software and/or in hardware are implemented, and as an independent control and/or as a part of a superordinate control. Whereas the means named in the case of an embodiment in hardware rather have a clearer characteristic, in an implementation in software the emphasis is rather on the functional characteristic of the means. At this point we point out expressly that the means for outputting a warning signal and/or braking vehicle 1 do not necessarily include the corresponding actuator, such as a warning light, a loudspeaker or the brake. Within the scope of the present invention, one may also, for instance, understand by these means a connection to central processing unit 4, via which a signal is able to be output that effects the corresponding action.

At the left and the right of vehicle 1, additional vehicles 8*a* and 8*b* are located. In the example, it is assumed that vehicles 8*a* and 8*b* are already at standstill, that is, they are in their parked positions, and vehicle 1 is now occupying the parking space that was left open. In addition to region A, laterally situated regions B and C are also scanned. It is easily seen that, here too, a few beams are already no longer impinging, within regions B and C, upon a physical limit (in this instance formed by vehicles 8*a* and 8*b*). These are further hints on a potential endangerment for vehicle 1, if it moves further.

At this point, we should mention that the present invention may also be used advantageously if no immediate danger threatens vehicle 1. For example, the method described for FIG. 2 may also be used if vehicles 1, 8*a* and 8*b* are located on a larger plane (e.g. a meadow). With the aid of laterally situated sensors 3, vehicle 1 may be put up in the parking space in such a way that it does not substantially project beyond other vehicles 8*a* and 8*b*. Consequently, the remaining traffic is obstructed as little as possible.

In one additional variant of the present invention, it is also checked whether the change with time of distance a, that is, the change with time of the length of an imaginary beam, is exceeding a specifiable threshold value. Only when this condition also applies is a warning signal output and/or is vehicle 1 braked. For the example shown in FIGS. 1 and 2 this applies, for distance a changes abruptly to "infinity" (i.e. a possible physical limit is outside recording regions A, B and C). But it is also conceivable that vehicle 1 is located on a roadway 2 that runs downwards in an ever steeper manner. Provided the incline is not nevertheless dangerous, warning/braking may be omitted. In this context, the change with time in distance a should always be seen in relation to the speed of vehicle 1. If vehicle 1 is traveling slowly, even a comparatively low changing speed may trigger a warning signal/braking, while at rapid travel, only a relatively high changing speed leads to a warning signal/braking.

Alternatively or in addition to the change with time of distance a, the change of distance a may also take place in relation to the path already covered by vehicle 1. The above-mentioned principles apply analogously to this variant.

An additional possibility for the detection of a roadway 2, running downwards, may take place by using the fact that the beams, running at a steep angle to the direction of motion of vehicle 1, constantly impinge upon a physical limit even during the traveling on of vehicle 1, while the flat beams aim into empty space.

Finally, let it be noted that, although it has been described only for land motor vehicles, the present invention is also equally suitable for watercraft and aircraft. For aircraft, the same basic principles apply as for land vehicles, on the assumption they are located on the ground. In the case of watercraft, as a "precipice", a waterfall, for example, should be taken into consideration.

What is claimed is:

1. A method for increasing the safety of a vehicle, comprising:

scanning, by a sensor, a region about the vehicle;

measuring, by a central processing unit, a distance between at least one location on the vehicle and a physical limit of the region in at least one direction;

checking, by the central processing unit, whether the distance exceeds a threshold value; and performing, by the central processing unit, at least one of (a) outputting a warning signal and (b) braking the vehicle, if a result of the checking is positive;

wherein the region is scanned at least one of (a) in front, under the vehicle and (b) at a rear, under the vehicle.

2. The method according to claim 1, wherein the region is additionally scanned laterally to the vehicle.

3. The method according to claim 1, wherein a plurality of distances between a plurality of locations on the vehicle and a physical limit of the region are measured.

4. The method according to claim 1, wherein a plurality of distances are measured in a plurality of directions.

5. The method according to claim 1, wherein the at least one of the outputting and the braking takes place only when the result of the checking for a specified number or group of distances is positive.

6. The method according to claim 1, wherein it is checked additionally whether a change with time in the distance or a change in the distance in relation to a path covered by the vehicle exceeds a threshold value.

7. A method for increasing the safety of a vehicle, comprising:

scanning, by a sensor, a region about the vehicle;

measuring, by a central processing unit, a distance between at least one location on the vehicle and a physical limit of the region in at least one direction;

checking, by the central processing unit, whether the distance exceeds a threshold value; and performing, by the central processing unit, at least one of (a) outputting a warning signal and (b) braking the vehicle, if a result of the checking is positive;

wherein the region laterally under the vehicle is scanned.

8. A central processing unit for a driver assistance system, comprising:

a sensor interface for connecting at least one sensor, which is capable of scanning a region about a vehicle;

means for measuring a distance, or receiving a measured distance, between at least one location on the vehicle and a physical limit of the region in at least one direction;

means for checking whether the distance exceeds a threshold value; and means for at least one of (a) outputting a warning signal and (b) braking the vehicle, if a result of the checking is positive;

wherein the region is scanned at least one of (a) in front, under the vehicle and (b) at a rear, under the vehicle.

9. A driver assistance system for a vehicle, comprising:

at least one sensor for scanning a region about the vehicle; and a central processing unit including:

a sensor interface for connecting the central processing unit to the at least one sensor, means for measuring a distance, or receiving a measured distance, between at least one location on the vehicle and a physical limit of the region in at least one direction, means for checking whether the distance exceeds a threshold value, and means for at least one of (a) outputting a warning signal and (b) braking the vehicle, if a result of the checking is positive;

wherein the region is scanned at least one of (a) in front, under the vehicle and (b) at a rear, under the vehicle.

* * * * *